United States Patent
Knebel et al.

(10) Patent No.: US 10,459,209 B2
(45) Date of Patent: Oct. 29, 2019

(54) METHOD AND MICROSCOPE FOR EXAMINING A SAMPLE

(71) Applicant: Leica Microsystems CMS GmbH, Wetzlar (DE)

(72) Inventors: Werner Knebel, Kronau (DE); Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 16/091,522

(22) PCT Filed: Apr. 7, 2017

(86) PCT No.: PCT/EP2017/058420
§ 371 (c)(1),
(2) Date: Oct. 5, 2018

(87) PCT Pub. No.: WO2017/174792
PCT Pub. Date: Oct. 12, 2017

(65) Prior Publication Data
US 2019/0129156 A1    May 2, 2019

(30) Foreign Application Priority Data

Apr. 8, 2016  (LU) .......................... 93022

(51) Int. Cl.
*G02B 21/16* (2006.01)
*G02B 21/36* (2006.01)
*G02B 21/00* (2006.01)

(52) U.S. Cl.
CPC ......... *G02B 21/16* (2013.01); *G02B 21/0032* (2013.01); *G02B 21/0036* (2013.01); *G02B 21/367* (2013.01)

(58) Field of Classification Search
CPC .... G02B 21/34; G02B 6/0036; G02B 21/367; G02B 21/16; G02B 21/0032; G02B 21/0036
See application file for complete search history.

(56) References Cited

U.S. PATENT DOCUMENTS

| 2006/0033987 A1 | 2/2006 | Stelzer et al. |
| 2012/0200693 A1 | 8/2012 | Lippert et al. |

(Continued)

FOREIGN PATENT DOCUMENTS

| DE | 10257423 A1 | 6/2004 |
| DE | 102009044983 A1 | 3/2011 |

(Continued)

OTHER PUBLICATIONS

Ober R J et al: "Simultaneous Imaging of Different Focal Planes in Fluorescence Microscopy for the Study of Cellular Dynamics in Three Dimensions", IEEE Transactions on Nanobioscience, IEEE Service Center, Piscataway, NY, US, vol. 3, No. 4, Dec. 1, 2004 (Dec. 1, 2004), pp. 237-242, XP011122942.

(Continued)

*Primary Examiner* — David P Porta
*Assistant Examiner* — Fani Boosalis
(74) *Attorney, Agent, or Firm* — Leydig, Voit & Mayer, Ltd.

(57) ABSTRACT

The invention relates to a method for examining a sample. The method is distinguished by the fact that the sample is illuminated with an illumination light beam in each case simultaneously in a plurality of mutually different sample planes in each case along an illumination line, and wherein each sample region illuminated along an illumination line is scanned in each case with a dedicated detection PSF and the detection light emanating from the illuminated sample regions is detected simultaneously and spatially separately (Continued)

from one another. The invention additionally relates to a microscope, in particular for performing such a method.

19 Claims, 8 Drawing Sheets

(56) References Cited

U.S. PATENT DOCUMENTS

| | | |
|---|---|---|
| 2012/0206798 A1 | 8/2012 | Knop et al. |
| 2015/0098126 A1 | 4/2015 | Keller et al. |
| 2016/0048014 A1 | 2/2016 | Knebel et al. |
| 2017/0068086 A1* | 3/2017 | Tomer .................. G02B 21/367 |

FOREIGN PATENT DOCUMENTS

| | | |
|---|---|---|
| DE | 102013205115 A1 | 9/2014 |
| WO | WO 2015184124 A1 | 12/2015 |

OTHER PUBLICATIONS

Florian O. Fahrbach, et al., "Rapid 3D light-sheet microscopy with a tunable lens", Optics Express, vol. 21, No. 18, Aug. 30, 2013, pp. 1-17.

* cited by examiner

METHOD AND MICROSCOPE FOR EXAMINING A SAMPLE

CROSS-REFERENCE TO PRIOR APPLICATIONS

This application is a U.S. National Stage Application under 35 U.S.C. § 371 of International Application No. PCT/EP2017/058420 filed on Apr. 7, 2017, and claims benefit to Luxembourgian Patent Application No. LU 93022 filed on Apr. 8, 2016. The International Application was published in German on Oct. 12, 2017 as WO 2017/174792 A1 under PCT Article 21(2).

FIELD

The invention relates to a method for examining a sample. The invention also relates to a microscope, in particular for carrying out such a method.

BACKGROUND

When examining a sample, it is often important to be able to rapidly form an image of entire sample volumes. To do so, the use of an SPIM microscope is considered in particular.

The SPIM (single plane illumination microscopy) technique, in which a sample is illuminated in layers, allows image data to be captured more quickly and in a gentler manner for the sample compared with scanning a sample at specific points, for example. A known field of use of SPIM technology is the field of fluorescence microscopy, in which fluorophores in the sample are excited by means of laser light. In SPIM technology, excitation takes place only in one of an illumination light sheet. Damage to the sample caused by illumination light in other planes is thus avoided.

An optical apparatus that functions in accordance with the SPIM method is described in DE 102 57 423 A1. In this microscope, a sample is illuminated by a thin light sheet whilst being observed perpendicularly to the plane of the illuminating light sheet. Here, the illumination and the detection take place over two separate optical ray paths each having separate optics, in particular having two separate objectives perpendicular to one another.

DE 10 2009 044 983 A1 discloses a microscope which includes an illumination device by which a light sheet for illuminating a sample region is generated, which light sheet is extended in an approximately planar manner in the direction of an illumination axis of an illumination ray path and in the direction of a transverse axis arranged transversely to the illumination axis. The microscope additionally includes a detection device by which light radiated from the sample region along a detection axis of a detection ray path is detected, the illumination axis and detection axis and also the transverse axis and detection axis being arranged at an angle other than zero to one another, and the detection device additionally including a detection objective in the detection ray path. In a microscope of this kind, the detection device additionally includes an optical detection element, which is arranged spatially separately from a front lens of the detection objective, is adjustable independently thereof, and by means of which the size of a detection image field can be continuously varied, and/or by means of which a detection focus plane in the sample region can be continuously adjusted.

From Fahrbach, F. O., Voigt, F. F., Schmid, B., Heimchen, F. & Huisken, J. Rapid 3D light-sheet microscopy with a tunable lens. Opt. Express 21, 21010 (2013), it is known to rapidly shift a light sheet along the detection axis in order to rapidly form an image of volumes, and to correct the sharpness plane of the detection optics using a tunable lens.

DE 10 2013 205 115 A1 discloses an SPIM arrangement including an illumination device for generating a light sheet that illuminates a sample, and including a detection device that has a detector and detects detection light emanating from the sample. In terms of efficient and gentle sample examination, the SPIM arrangement is equipped with structurally simple means and is developed such that the detection device includes a device for assigning various focal planes of the light sheet to various regions of the detector. The device can, for example, include a multi-focus grating or a chromatic correction grating.

SUMMARY

An embodiment of the present invention provides a method for examining a sample that includes: simultaneously illuminating the sample in a plurality of different sample planes using respective illumination light beams along respective illumination lines; scanning each sample region illuminated along an illumination line of the illumination lines by a separate detection point spread function (PSF); and detecting a detection light emanating from the illuminated sample regions simultaneously and in a spatially separate manner.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide a method that makes it possible to rapidly form a high-resolution image of a sample volume.

Embodiments of the present invention provide a method characterized in that the sample is illuminated simultaneously in a plurality of different sample planes by means of respective illumination light beams along respective lines (illumination lines), and each sample region illuminated along an illumination line being scanned by a separate detection PSF and the detection light emanating from the illuminated sample regions being detected simultaneously and in a spatially separate manner.

Embodiments of the present invention provide a microscope that makes it possible to rapidly form high-contrast and high-resolution images of a sample volume.

Embodiments of the present invention provide a microscope characterized by an illumination arrangement that includes an illumination objective and is designed to simultaneously illuminate a sample in a plurality of different sample planes by means of respective illumination light beams along respective illumination lines, and by a detection arrangement that includes a detection objective and at least one detector and is designed to scan each sample region illuminated along an illumination line using a separate detection PSF in each case and to scan the detection light emanating from the illuminated sample regions simultaneously and in a spatially separate manner.

The invention makes it possible to generate high-resolution image data from different, in particular parallel, sample planes simultaneously in order to obtain a 3D stack of image data.

One special feature of the invention is that the sample is simultaneously illuminated in a plurality of sample planes along respective illumination lines located in each sample plane. In a particularly advantageous manner, this approach makes it possible to offset the illumination lines from one another such that crosstalk of the detection light from the individual sample planes onto the detection channels of the other sample planes is prevented effectively.

Figure 1:
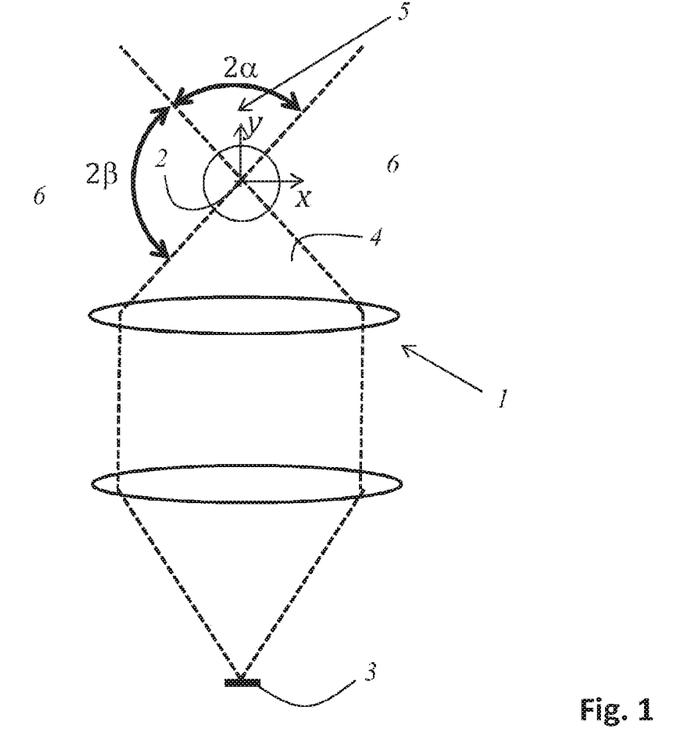
FIG. 1 is a schematic view of a detection ray path to explain the relationships during detection.

As shown in FIG. 1, a detection objective 1 forms an image on a line detector 3 of the part of the detection light emanating from a sample region illuminated along a first illumination line 2 that propagates in a cuneiform volume 4 at an aperture angle $2\alpha$ that is dependent on the numerical aperture of the objective 1. On the basis of FIG. 1, the first illumination line is perpendicular to the plane of the paper (z-direction). The formation of the detection ray path and in particular of the detection objective 1 defines a detection volume, specifically a detection PSF 5 (point spread function), the detection light emanating from the detection PSF 5 arriving at the detection objective 1 through the cuneiform volume 4.

To prevent the detection objective 1 forming an image on the line detector 3, assigned to the first sample region, of the detection light emanating from a different sample region illuminated along a different illumination line, the other illumination line is preferably arranged outside the cuneiform volume 4 at the aperture angle $2\alpha$, specifically in one of the two cuneiform regions 6 at the aperture angle $2\beta$, preferably such that the other illumination line is arranged in a different sample plane; this makes it possible to simultaneously scan two different sample planes by simultaneously shifting the illumination lines sideways, without crosstalk occurring. This principle, explained on the basis of two illumination lines, can also be implemented using a higher number of illumination lines, adjacent illumination lines being offset from one another as stated above.

Advantageously, crosstalk is prevented by the spacing between two adjacent illumination lines being greater than the sum of the illumination light beam radius and the radius of the adjacent detection PSF in the plane of the illumination beam. Particularly advantageously, the position of the illumination lines is selected such that the illumination beams are not positioned in the detection cone (detection PSF) of other lines in different planes.

As mentioned, the present invention makes it possible to simultaneously scan a plurality of, in particular parallel, sample planes using at least one illumination line in each case, the illumination lines being shifted, preferably simultaneously, along the respective sample planes (in other words, along a vector parallel to a sample plane). In particular, the illumination lines can be arranged so as to be offset from one another in a direction along the sample planes and perpendicularly to the illumination light propagation direction. Additionally or alternatively, it is also possible for the illumination lines to be arranged so as to be offset from one another in the direction along the sample planes and perpendicularly to the optical axis of a detection objective. As already mentioned, to prevent crosstalk, it is particularly advantageous for none of the other illumination lines to be arranged in the detection light beam emanating from a sample region.

Particularly high image contrast can be achieved by confocal line detection being carried out in relation to each illumination line. This is done by using a slit detector arrangement arranged confocally with respect to the illumination line.

It may be advantageous, for example, for the detection light emanating from a sample region illuminated along an illumination line to be detected by a detector, in particular a planar detector, upstream of which a slit diaphragm is arranged. A slit detector of this kind can, for example, be formed by an optical element in which a surface leaving a gap is metal-coated. However, the use of a mechanical slit detector is complex because when the illumination line is shifted, the slit detector arrangement is also shifted at the same time, or alternatively the detection light has to be scanned, for example by means of a ray deflection device that has an adjustable deflection angle and is arranged in the detection ray path, so that the detection light emanating from the relevant moved illumination line can reach the slit detector. More details on this can be found in particular below with reference to the embodiments.

In particular, the upstream slit detector can be a mechanical curtain, as used in reflex cameras. In this embodiment, the planar detector can be active in respect of its entire sensor surface, in particular even while the slit diaphragm is being moved synchronously with the illumination light beam moving along the illumination lines.

Particularly advantageously, the slit diaphragm can also be designed as a non-mechanical component. For example, the slit detector can be formed as a mirror that can be switched in some portions, or as an absorber that can be switched in some portions, e.g. on the basis of liquid crystals.

Alternatively, it is also possible for the detection light emanating from each sample region illuminated along an illumination line to be detected by a detector acting as a slit detector, the slit detector being formed by the actively switched part of a planar detector, for example a CMOS detector or an sCMOS detector. By way of example, it is advantageously possible to read out only one part of the planar detector, specifically the part corresponding precisely to the slit detector (actively switched part), whilst the other parts of the planar detector, specifically the parts outside the slit detector, are not read out (part not actively switched). In this way, confocal detection is also possible.

In an embodiment of this type, mechanical components, such as an additional mechanical slit diaphragm, are avoided, which is advantageous in particular if the slit detector is to be shifted in the detection plane. In an embodiment of this kind, specifically the planar detector can remain stationary, in particular relative to the detection objective and/or the illumination objective and/or the sample and/or relative to the incident detection light, in which case different parts of the sensor surface of the planar detector, which then form the slit detector, are actively switched in chronological succession, specifically in such a way that only the detection light incident on the actively switched part is detected whilst detection light incident on the inactively switched parts of the planar detector is not detected.

If the parts of the planar detector that are actively switched in immediate chronological succession are arranged spatially directly adjacently to one another, this results in a spatially uninterrupted movement of the slit detector, without having to move mechanical components for this purpose. Specifically, a region of actively switched pixels can run along the sensor surface of the planar detector in a uniform manner and synchronously with an illumination light beam providing illumination along an illumination line. In this respect, an embodiment of this kind has the particular advantage of a long service life because movement-induced wear, for example of mechanical diaphragms, is avoided.

In a particular embodiment, each illuminated sample region is assigned its own detector. In this case, the detectors assigned to the different sample regions can in particular be arranged in different detection planes, thus taking account of the situation where the sample regions illuminated along respective illumination lines are arranged in different sample planes.

Alternatively, it is also possible for each illuminated sample region to be assigned its own detection region on a shared planar detector. In order to ensure that, when a shared planar detector is used, the detection light from all sample regions is focused in the same detection plane, i.e. the detection plane of the planar detector, different elements for adjusting the optical light path, for example glass blocks of different thicknesses, and/or different focusing or defocusing elements, for example adjustable lenses, can be arranged in the different detection ray path branches.

In a particular embodiment, the detection light emanating from the sample is divided into different detection ray path branches by means of at least one beam splitter depending on the location of origin of the light, i.e. depending on the location of the relevant sample region illuminated by an illumination line.

Figure 3:
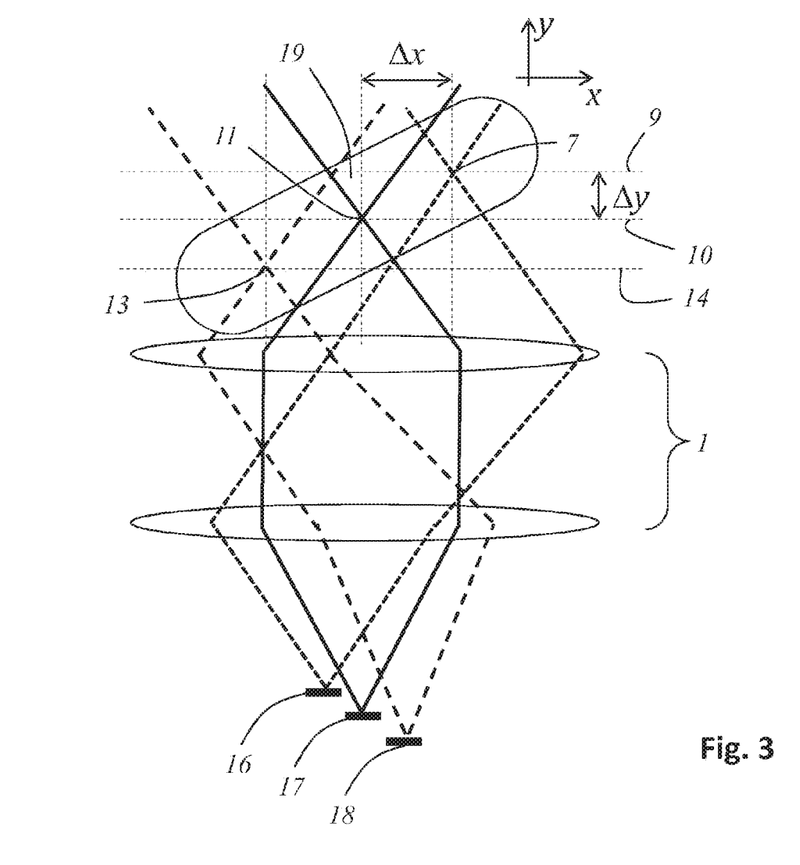
FIG. 3 is a schematic view of the illumination and the detection ray path of a second embodiment of a microscope according to the invention.

The principle explained above on the basis of FIG. 1 can also be implemented by the sample being simultaneously illuminated along at least two adjacent illumination lines by a light sheet that illuminates the two illumination lines at the same time, instead of by a separate illumination light beam in each case. In this case, the light sheet plane is preferably oblique, in other words at an angle other than zero to the sample planes. By positioning the light sheet obliquely, crosstalk of the detection light of one illumination line can advantageously be prevented the detector assigned to the other illumination line. To achieve this, the parallel offset $\Delta x$ between adjacent illumination lines can advantageously be greater than the sum of the detection PSF radius and half the extension of the light sheet in the direction of the sample plane perpendicularly to the light propagation direction, as illustrated by FIG. 3.

By way of example, the method according to the invention can be carried out such that the illumination light is focused by means of an illumination objective and such that the detection light emanating from the sample passes through a detection objective, the optical axis of the illumination objective and the optical axis of the detection objective being arranged in planes that are perpendicular to one another.

In an embodiment that can be carried out particularly flexibly, in which good sample accessibility is ensured in particular, the optical axis of the illumination objective and the optical axis of the detection objective are oriented in parallel or coaxially with one another. In particular, downstream of the illumination objective there can be a deflection means that deflects the illumination light, for example at a right angle, after it has passed through the illumination objective. A construction of this type also makes it possible to use upright or inverse standard microscope stands.

The microscope according to the invention can advantageously be constructed on the basis of a scanning microscope, in particular a confocal scanning microscope. In this respect, the use of a scanning microscope (possibly provided anyway in a laboratory) is particularly advantageous for carrying out the method according to the invention.

As already mentioned, the illuminating light beam can advantageously be moved relative to the sample in the illumination plane. For this purpose, a ray deflection device having an adjustable deflection angle can be used for example. A ray deflection device of this kind can include at least one mirror galvanometer, for example. In particular, the already present beam deflection apparatus of a scanning microscope, in particular of a confocal scanning microscope, can also be used for example, in particular if the microscope according to the invention is produced by retrofitting a scanning microscope or the method according to the invention is carried out by means of a scanning microscope.

Many methods are available for generating the illumination light beams that provide illumination along the illumination lines. For example, a simple grating or a special diffractive element that generates precisely the desired number of rays while preferably simultaneously also ensuring that all the illumination light beams are of the same brightness can be arranged in a plane conjugate with the pupil of the illumination objective. In this respect, it is important that the desired ray offset along the detection axis is combined with a sufficient offset in the direction of the sample planes. When a grating is used, this can be achieved by the grating structure being rotated in the x-y plane (i.e. about the optical axis of the illumination ray path). Alternatively or additionally, splitting is also possible by way of polarization by means of birefractive materials, or by using acousto-optical components. The grating can also be flexibly implemented by an SLM (spatial light modulator), for example.

In addition, if a plurality of fluorophores are used in the sample, it is possible to excite different fluorophores in different sample planes, for example using various laser lines. As a result, separation can be carried out in the detection ray path by means of chromatic filters, in particular chromatic bandpass filters, and/or by means of chromatic beam splitters.

Advantageously, the microscope according to the invention can include an in particular electronic and/or computerized controller that controls, in a synchronous manner, the movement of the illumination light that provides illumination along the illumination lines and/or the movement of the slit detectors or a scanning ray deflection device.

The subject matter of embodiments of the invention is shown schematically by way of example in the drawings and will be described below on the basis thereof, like elements or those having the same function being provided with the same reference signs in most cases.

Figure 2:
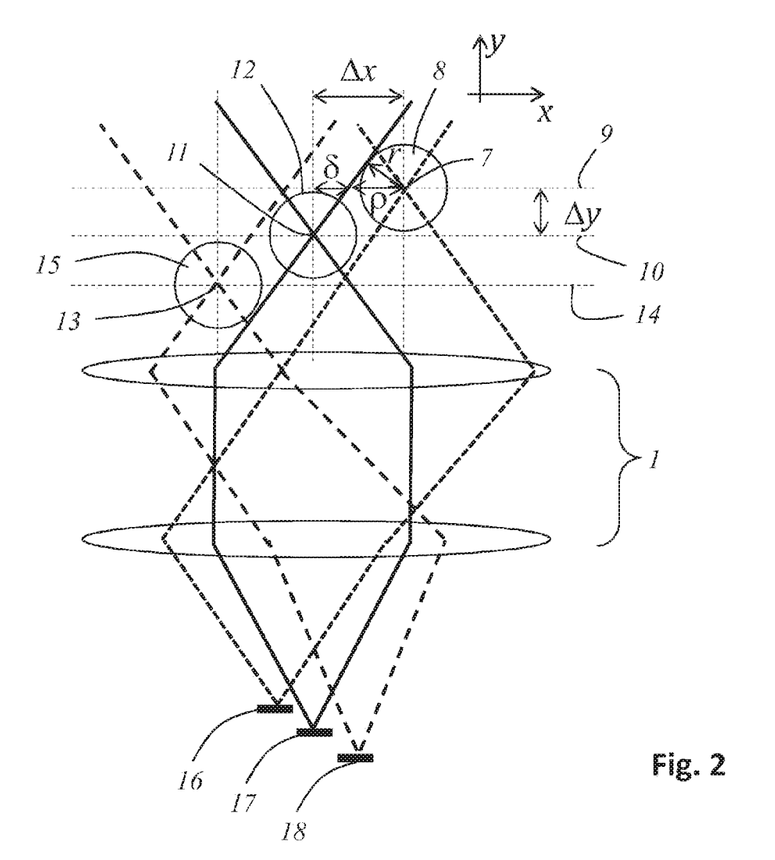
FIG. 2 is a schematic view of the illumination and the detection ray path of a first embodiment of a microscope according to the invention.

FIG. 2 is a schematic view of the illumination and the detection ray path of a first embodiment of a microscope according to the invention. In this embodiment, a sample is illuminated along a first illumination line 7 perpendicular to the plane of the drawing, by means of a first illumination light beam 8 which propagates along the first illumination line 7. The first illumination light beam 8 includes an illumination light beam radius ρ. The first illumination line 7 is located in its first sample plane 9.

In a second sample plane 10, which is arranged in parallel with the first sample plane 9, the sample is illuminated along a second illumination line 11 by means of a second illumination light beam 12 which propagates along the second illumination line 11. The second illumination line 11 is arranged in parallel with the first illumination line 7. The second illumination line 11 is arranged so as to be offset perpendicularly to the optical axis of a detection objective 1 by the value Δx, the first sample plane 9 and the second sample plane 10 being at a spacing Δy from one another.

In addition, the sample is illuminated along a third illumination line 13 in a third sample plane 14 by means of a third illumination light beam 15.

An image of the detection light emanating from the sample region illuminated by means of the first illumination light beam 8 is formed on a first line detector 16 by means of a detection objective 1 (or detection optics). An image of the detection light emanating from the sample region illuminated by means of the second illumination light beam 12 is formed on a second line detector 17. An image of the detection light emanating from the sample region illuminated by means of the third illumination light beam 15 is formed on a third line detector 18. The line detectors 16, 17, and 18 are located in different detection planes, which are conjugate with the respective illumination planes. In the embodiment shown, illumination takes place, by way of example, using three illumination light beams 8, 12, 15 and detection takes place using three line detectors 16, 17, 18. In principle, however, the number of illumination light beams and illuminated sample planes that can be used is unlimited. In this respect, it is also possible to simultaneously illuminate the sample using an even greater number of illumination light beams in an even greater number of sample planes.

The offset Δx between adjacent illumination lines in the x-direction is selected such that: $\Delta x > \delta + \rho$, where the value δ is the radius of the detection PSF in the respective sample planes 9, 10, 14 (roughly $\delta = \Delta y \cdot \tan(\alpha)$, where $\alpha = \arcsin(NA/n)$ of the object-side aperture angle, NA is the numerical aperture, and n is the refractive index) and ρ is the distance resulting from the radius of the adjacent illumination light beam by means of the formula $\rho = r/\cos(\alpha)$. Sharp images of the sample regions illuminated by the three illumination light beams 8, 12, 15 are formed on the detectors in corresponding image planes on the basis of the selected geometry, with crosstalk to the other detectors being prevented in the process.

By way of example, the offset Δy between adjacent illumination lines in the y-direction is selected such that the sum of the radii r of the corresponding illumination light beams is greater than Δy. (This is not shown in FIG. 2.)

FIG. 3 is a schematic view of the illumination and detection ray path of a second embodiment, in which, unlike the example shown in FIG. 2, the illumination lines 7, 11, 13 are not illuminated by individual, spatially separate illumination light beams 8, 12, 15, but rather by a light sheet 19 positioned obliquely. The light sheet 19 propagates in the direction of the illumination lines 7, 11, 13 (i.e. perpendicularly to the plane of the drawing). Positioning the light sheet plane of the light sheet 19 obliquely relative to the sample planes 9, 10, 14 allows for illumination along the illumination lines 7, 11, 13 arranged in different illumination planes 9, 10, 14, with crosstalk also being prevented in the process, at least to a certain degree, by using line detectors. The optical quality in this embodiment is not as high as in the embodiment shown in FIG. 2 since crosstalk can only be prevented to a certain degree; this is mainly due to the light sheet 19 having to be relatively thick.

Figure 4:
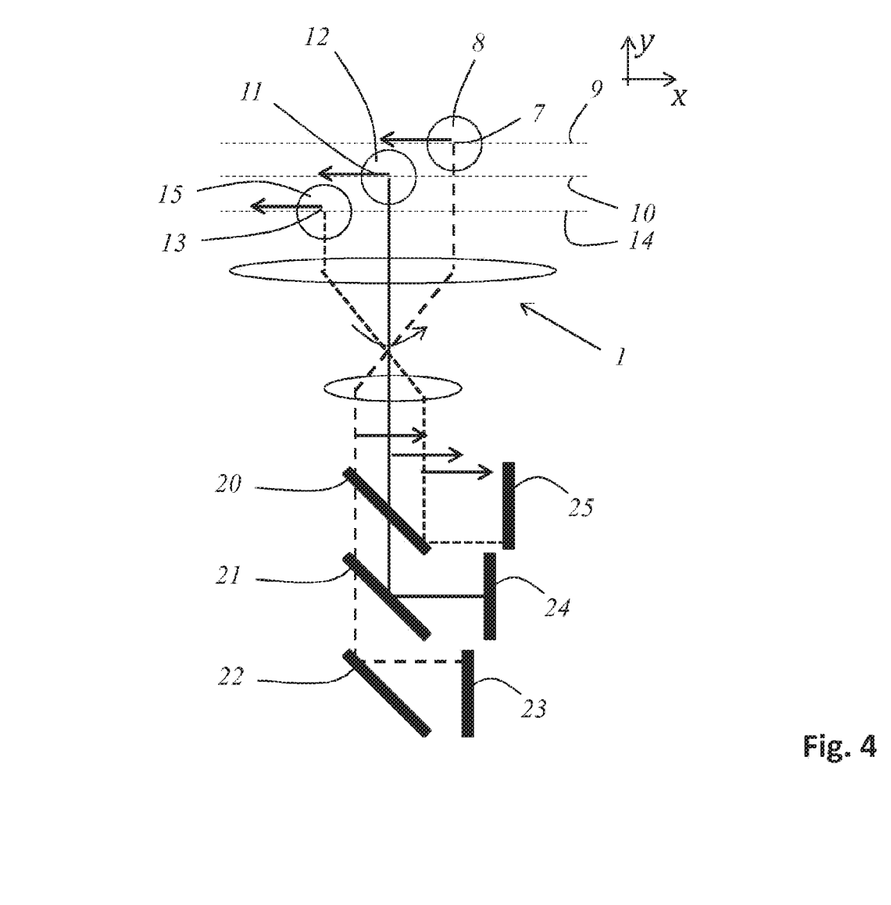
FIG. 4 is a schematic view of the illumination and the detection ray path of a third embodiment of a microscope according to the invention.

FIG. 4 is a schematic view of the illumination and the detection ray path of a third embodiment of a microscope according to the invention. The illumination light beam 8, which illuminates a sample region along an illumination line 7 in a first sample plane, the second illumination light beam 12, which illuminates a second sample region along a second illumination line 11 in a second sample plane 10, and the third illumination light beam 15, which illuminates a third sample region along a third illumination line 13 in a third sample plane 14, are simultaneously shifted along the sample planes 9, 10, 14 in order to successively scan each of the sample planes 9, 10, 14 and thus to achieve a 3D stack of data on the sample.

The detection ray path includes a deflection mirror 22, by means of which the detection light emanating from the sample region illuminated by means of the first illumination light beam 8 is deflected onto a first planar detector 23. The detection ray path further includes a first beam splitter 21, which deflects the detection light emanating from the sample region illuminated by means of the second illumination light beam 12 onto a second planar detector 24. The detection ray path also contains a second beam splitter 20, which deflects the detection light emanating from the sample region illuminated by means of the third illumination light beam 15 onto a third planar detector 25.

The planar detectors 23, 24, 25 are arranged such that sharp images of each of the illuminated sample regions are formed. During detection, the foci of each detection light beam travel along the surface of the planar detectors 23, 24, 25 in accordance with the movement of the illumination light beams 8, 10, 15. Advantageously in this case, just one narrow strip of each planar detector 23, 24, 25 may be actively switched, whereas the neighboring regions are inactively switched. This produces a slit detector that allows for confocal detection.

By connecting the planar detectors 23, 24, 25 so as to be synchronous with the movement of the illumination light beams 8, 12, 15, the actively switched part of each planar detector 23, 24, 25 can be made to move together with the beams, thus producing a type of "rolling shutter", i.e. a slit detector arrangement that moves synchronously with the movement of the illumination light beams 8, 12, 15. A particularly advantageous sub-category of this method involves exciting different fluorophores in different sample planes, for example using various laser lines. As a result, separation can be carried out in the detection ray path by means of chromatic filters, in particular chromatic bandpass filters, and/or by means of chromatic beam splitters.

Figure 5:
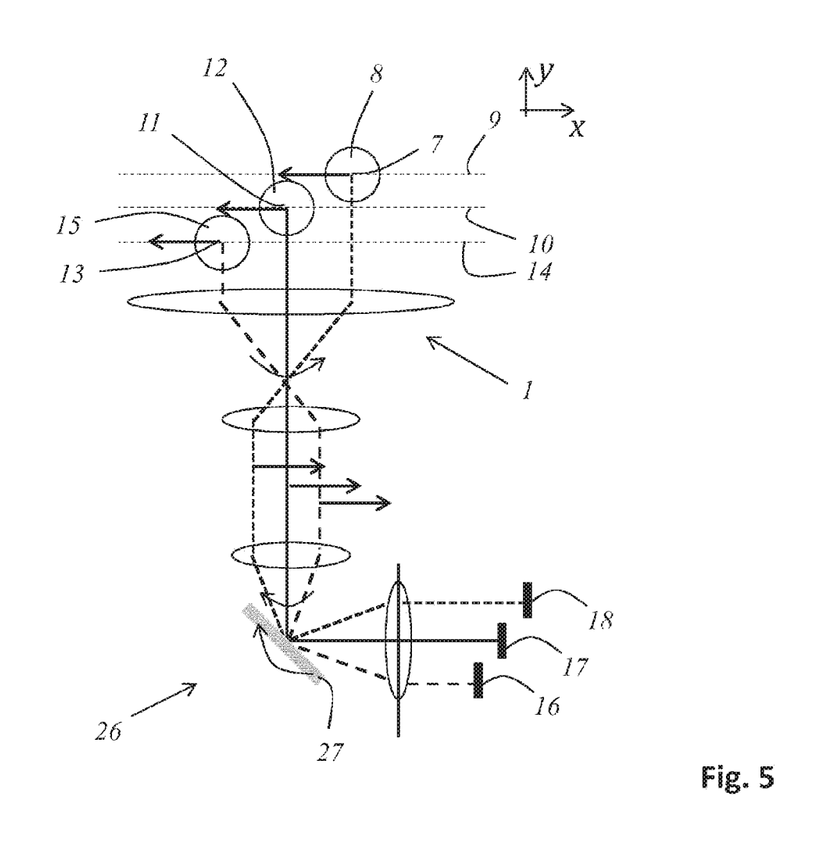
FIG. 5 is a schematic view of the illumination and the detection ray path of a fourth embodiment of a microscope according to the invention.

FIG. 5 is a schematic view of the illumination and the detection ray path of a fourth embodiment. In this embodiment, in the detection ray path there is a ray deflection device 26 that has an adjustable deflection angle and contains a mirror 27 rotatably mounted by means of a galvanometer drive. The ray deflection device is controlled synchronously with the movement of the illumination light beams 8, 10, 12 such that, unlike in the embodiment shown in FIG. 4, the foci of the detection light do not travel over the surface of the line detectors 16, 17, 18, but rather remain stationary. An embodiment of this kind has the particular advantage whereby stationary mechanical diaphragms can in particular also be used.

Figure 6:
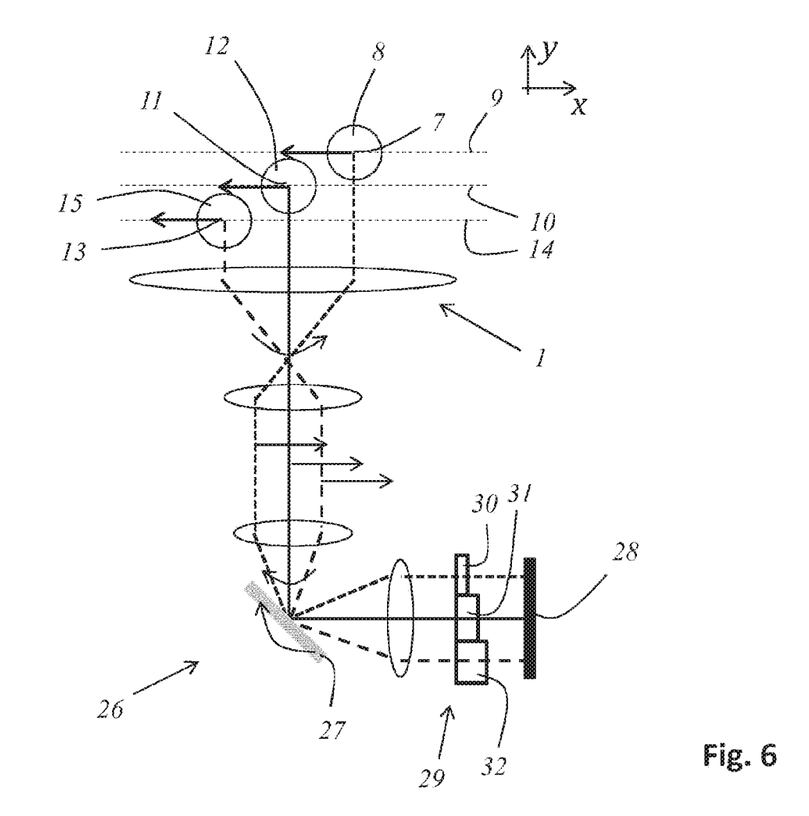
FIG. 6 is a schematic view of the illumination and the detection ray path of a fifth embodiment of a microscope according to the invention.

FIG. 6 is a schematic view of the illumination and the detection ray path of a fifth embodiment of a microscope according to the invention. Unlike the embodiment shown in FIG. 5, just one planar detector 28 is provided, each illuminated sample region being assigned its own detection region on the shared planar detector 28. To ensure that sharp images of all the detection light beams are formed on the planar detector 28, a means 29 for influencing the optical path length is arranged in each detection ray sub-path. The means is a first, relatively thin glass block 30, a second, slightly thicker glass block 31, and a third glass block 32 that is even thicker. To prevent aberrations, in particular spherical aberrations, the glass blocks can include a surface shaped accordingly.

Figure 7:
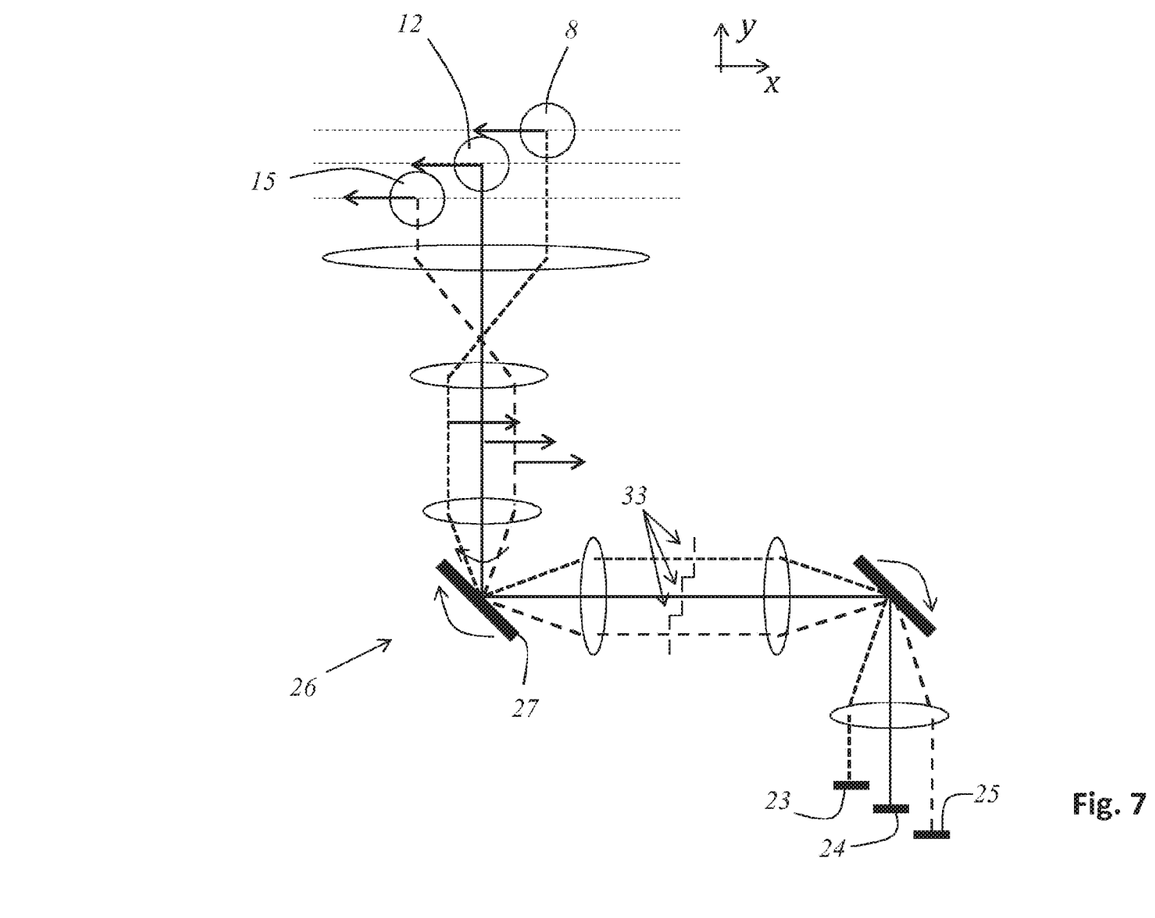
FIG. 7 is a schematic view of the illumination and the detection ray path of a sixth embodiment of a microscope according to the invention.

FIG. 7 is a schematic view of the illumination and the ray path of a sixth embodiment. In the detection ray path, this embodiment contains an additional ray deflection device having an adjustable deflection angle, in order to rescan the strip images, filtered by confocal diaphragms 33, in a synchronous manner with the movement of the illumination light beams 8, 12, 15, as a result of which confocal image data of the individual sample planes can be recorded directly using one planar detector 23, 24, 25 in each case, without the need for spatially continuous active switching.

Figure 8:
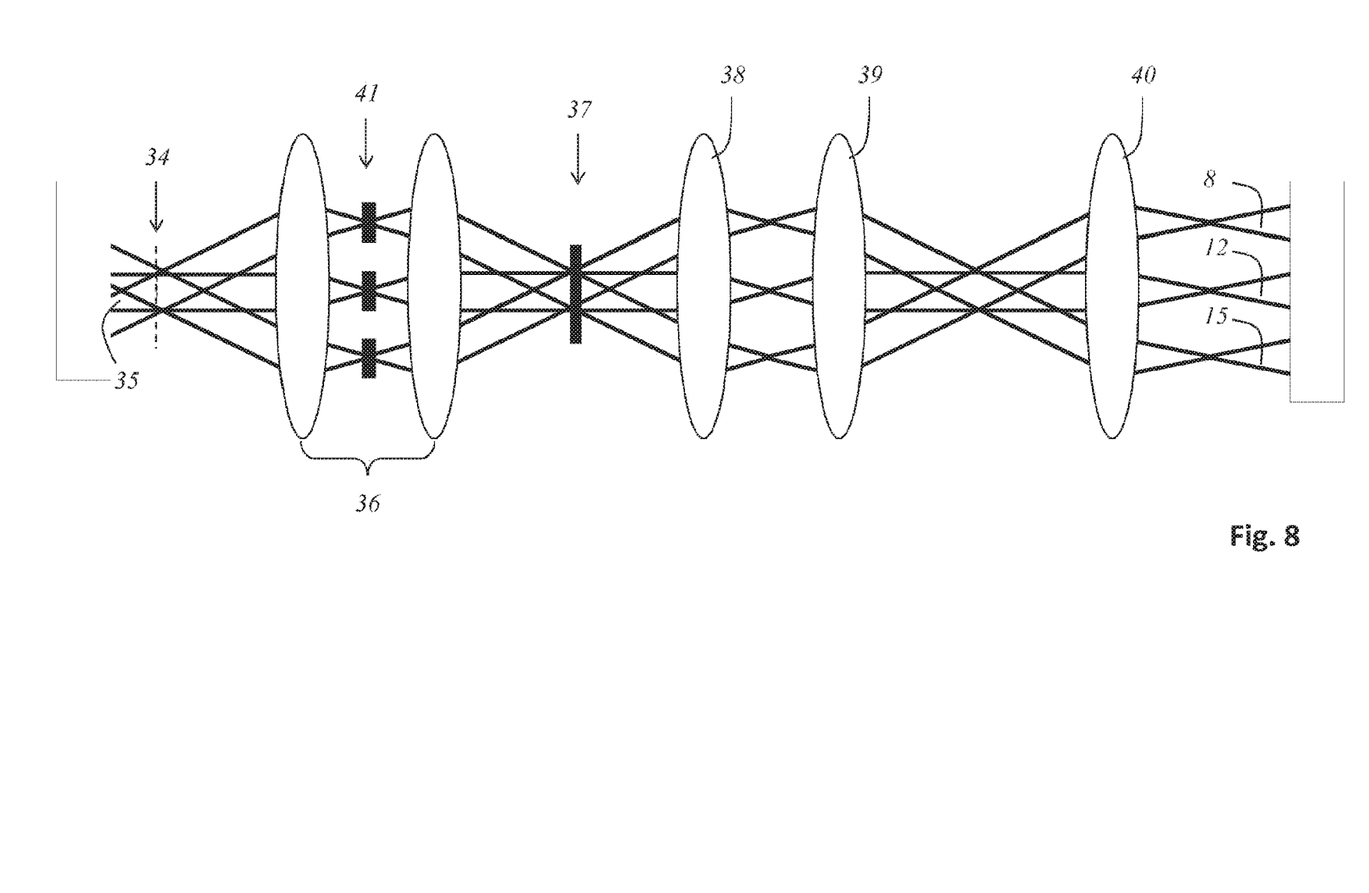
FIG. 8 schematically shows an example arrangement for generating a plurality of illumination light beams for simultaneous illumination along a plurality of offset illumination light lines.

FIG. 8 schematically shows an example arrangement for generating a plurality of illumination light beams 8, 12, 15 for simultaneous illumination along a plurality of offset illumination lines. The arrangement includes a grating 34 that spatially splits a primary illumination light beam 35, which can be generated in particular by a laser light source. Illumination light beams 8, 12, 15 then pass through a telescopic arrangement 36, which may additionally also contain a filter 41. This is followed by a ray deflection device 37 having an adjustable deflection angle, in order to be able to move each illumination light beam 8, 12, 15 in the respective sample planes thereof. The illumination light beams 8, 12, 15 originating from the ray deflection device 37 pass through a scanning lens 38, a tube lens 39, and lastly arrive at the illumination objective 40. After passing through the illumination objective 40, the illumination light beams 8, 12, 15 arrive at the sample (not shown here) either directly or after being deflected again.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Objective
2 Illumination line
3 Line detector
4 Cuneiform volume
5 Detection PSF
6 Cuneiform regions
7 First illumination line
8 First illumination light beam
9 First sample plane
10 Second sample plane
11 Second illumination line
12 Second illumination light beam
13 Third illumination line
14 Third sample plane
15 Third illumination light beam
16 First line detector
17 Second line detector
18 Third line detector
19 Light sheet
20 Second beam splitter
21 First beam splitter
22 Deflection mirror
23 First planar detector
24 Second planar detector
25 Third planar detector
26 Ray deflection device
27 Rotatably mounted minor
28 Planar detector
29 Means for influencing the optical path length
30 First glass block
31 Second glass block
32 Third glass block
33 Confocal diaphragms
34 Grid
35 Primary illumination light beam
36 Telescopic arrangement
37 Ray deflection device
38 Scanning lens
39 Tube lens
40 Illumination objective
41 Filter

The invention claimed is:

1. A method for examining a sample, the method comprising:
simultaneously illuminating the sample in a plurality of different sample planes using respective illumination light beams along respective illumination lines;
scanning each sample region illuminated along an illumination line of the illumination lines by a separate detection point spread function (PSF); and
detecting a detection light emanating from the illuminated sample regions simultaneously and in a spatially separate manner, wherein a spacing between two adjacent illumination lines of the illumination lines is greater than a sum of a respective illumination light beam radius of an illumination light beam of the illumination light beams and a radius of the adjacent detection PSF in a respective sample plane of the illumination beam.

2. The method according to claim 1, wherein the sample planes are oriented in parallel with one another.

3. The method according to claim 1, wherein:
the illumination lines are arranged so as to be offset from one another in a direction along the sample planes and perpendicularly to an illumination light propagation direction of the illumination light beams, and/or
the illumination lines are arranged so as to be offset from one another in a direction along the sample planes and perpendicularly to an optical axis of a detection objective, and/or
none of other illumination lines of the illumination lines is arranged in a detection light beam emanating from a sample region illuminated by an illumination line of the illumination lines.

4. The method according to claim 1, wherein each of the sample planes is successively scanned by synchronously shifting a respective one of the illumination light beams and the relevant detection PSF in parallel.

5. The method according to claim 1, wherein
a confocal line detection takes place, and/or
the detection light emanating from each of the sample regions illuminated along an illumination line of the illumination lines is detected by a detector, upstream of which a slit diaphragm is arranged, and/or
the detection light emanating from each of the sample regions illuminated along an illumination line of the illumination lines is detected by a slit detector, the slit detector being formed by the actively switched part of a planar detector.

6. The method according to claim 1,
wherein each of the illuminated sample regions is assigned its own detector, or
wherein each of the illuminated sample regions is assigned its own detection region on a shared planar detector.

7. The method according to claim 1, wherein the detection light emanating from the sample is divided into different detection ray path branches using at least one beam splitter depending on the location of origin of the detection light.

8. The method according to claim 1, wherein:
the sample is simultaneously illuminated along at least two adjacent illumination lines of the illumination lines by a light sheet instead of by a separate illumination light beam of the illumination light beams in each case, and/or
the sample is simultaneously illuminated along the at least two adjacent illumination lines by the light sheet instead of by a separate illumination light beam in each case, a spacing between the illumination lines being greater than a sum of a detection PSF radius of the detection PSF and half an extension of the light sheet in a direction of a respective one of the sample planes perpendicularly to the light propagation direction.

9. The method according to claim 1, wherein
each of the illumination light beams is focused using an illumination objective, and the detection light emanating from the sample passes through a detection objective, an optical axis of the illumination objective and an optical axis of the detection objective being arranged in planes that are perpendicular to one another, or each of the illumination light beams is focused using the illumination objective, and the detection light emanating from the sample passes through the detection objective, the optical axis of the illumination objective and the optical axis of the detection objective being oriented in parallel or coaxially with one another.

10. A microscope comprising:
an illumination arrangement that comprises an illumination objective and that is configured to simultaneously illuminate a sample in a plurality of different sample planes using respective illumination light beams along respective illumination lines; and
a detection arrangement that comprises a detection objective and at least one detector and that is configured to scan each sample region illuminated along an illumination line of the illumination lines using a separate detection point spread function (PSF) in each case and to scan a detection light emanating from the illuminated sample regions simultaneously and in a spatially separate manner,
wherein a spacing between two adjacent illumination lines of the illumination lines is greater than a sum of a detection PSF radius of the detection PSF and a respective illumination light beam radius of an illumination light beam of the illumination light beams.

11. The microscope according to claim 10, wherein the sample planes are oriented in parallel with one another.

12. The microscope according to claim 10, wherein:
the illumination lines are arranged so as to be offset from one another in a direction along the sample planes and perpendicularly to an illumination light propagation direction of the illumination light beams, and/or
the illumination lines are arranged so as to be offset from one another in a direction along the sample planes and perpendicularly to an optical axis of a detection objective, and/or
none of other illumination lines of the illumination lines is arranged in a detection light beam emanating from a sample region illuminated by an illumination line of the illumination lines.

13. The microscope according to claim 10, wherein:
the illumination arrangement comprises an illumination arrangement ray deflection device that has an adjustable deflection angle, and the illumination light beams can be shifted in parallel using the illumination arrangement ray deflection device, and/or
the detection arrangement comprises a deflection arrangement ray deflection device that has an adjustable deflection angle and is configured to scan the detection light.

14. The microscope according to claim 10,
wherein each of the illuminated sample regions is assigned its own detector, or
wherein each of the illuminated sample regions is assigned its own detection region on a shared planar detector.

15. The microscope according to claim 10, wherein:
the detection arrangement is configured to perform confocal line detection, and/or
the detection light emanating from each sample region illuminated along an illumination line is detected by a detector, upstream of which a slit diaphragm is arranged, and/or
the detection light emanating from a sample region of the sample regions illuminated along an illumination line of the illumination lines is detected by a slit detector of the at least one detector, the slit detector being formed by an actively switched part of a planar detector.

16. The microscope according to claim 10, wherein the detection arrangement comprises at least one beam splitter that splits the detection light emanating from the sample into different detection ray path branches depending on the location of origin of the detection light.

17. The microscope according to claim 10, wherein:
the illumination arrangement generates a light sheet that simultaneously illuminates the sample being examined along at least two adjacent illumination lines of the illumination lines instead of illumination by a separate illumination light beam of the illumination light beams in each case, and/or
the illumination arrangement generates the light sheet that simultaneously illuminates the sample being examined along the at least two adjacent illumination lines instead of illumination by the separate illumination light beam in each case, a spacing between the illumination lines being greater than a sum of a detection PSF radius of the detection PSF and half an extension of the light sheet in a direction of a respective one of the sample planes perpendicularly to the light propagation direction.

18. The microscope according to claim 10, wherein:
an optical axis of the illumination objective and an optical axis of the detection objective are arranged in planes that are perpendicular to one another, or
the optical axis of the illumination objective and the optical axis of the detection objective are oriented in parallel or coaxially with one another.

19. A method for examining a sample, the method comprising:
simultaneously illuminating the sample in a plurality of different sample planes using respective illumination light beams along respective illumination lines;
scanning each sample region illuminated along an illumination line of the illumination lines by a separate detection point spread function (PSF); and
detecting a detection light emanating from the illuminated sample regions simultaneously and in a spatially separate manner,
wherein:
a confocal line detection takes place, and/or
the detection light emanating from each of the sample regions illuminated along an illumination line of the illumination lines is detected by a detector, upstream of which a slit diaphragm is arranged, and/or
the detection light emanating from each of the sample regions illuminated along an illumination line of the illumination lines is detected by a slit detector, the slit detector being formed by the actively switched part of a planar detector.

* * * * *